United States Patent [19]

Boteler

[11] Patent Number: 4,947,281

[45] Date of Patent: Aug. 7, 1990

[54] SURGE SUPPRESSION MODULE

[75] Inventor: William C. Boteler, Bridgeport, Conn.

[73] Assignee: Hubbell Incorporated, Orange, Conn.

[21] Appl. No.: 437,613

[22] Filed: Nov. 17, 1989

Related U.S. Application Data

[63] Continuation of Ser. No. 168,418, Mar. 15, 1988, abandoned.

[51] Int. Cl.[5] .................. H02H 9/04

[52] U.S. Cl. .................. 361/56; 361/111; 361/127; 174/53

[58] Field of Search .................. 361/56, 54, 58, 111, 361/115, 118, 127, 356; 338/21, 220; 339/14 P, 147 P; 337/28-34, 197, 198; 174/53, 55, 58, 67; 340/638, 652, 656

[56] References Cited

U.S. PATENT DOCUMENTS

| | | | |
|---|---|---|---|
| 2,433,917 | 1/1948 | McCartney | 174/53 |
| 3,369,153 | 2/1968 | Arnold et al. | 361/118 |
| 3,716,651 | 2/1973 | Werner | 174/53 |
| 3,840,781 | 10/1974 | Brown | 361/111 |
| 4,071,872 | 1/1978 | Phillips, Jr. | 361/118 |
| 4,075,676 | 2/1978 | Phillips, Jr. | 361/56 |
| 4,191,985 | 5/1980 | Phillips, Jr. | 361/56 |
| 4,217,619 | 8/1980 | Tibolla | 361/56 |
| 4,500,862 | 2/1985 | Shedd | 337/32 |
| 4,587,588 | 5/1986 | Goldstein | 361/104 X |
| 4,688,135 | 8/1987 | Leopold | 361/118 |

OTHER PUBLICATIONS

Electronic Specialists, Inc., "Hi-Tech Equipment Protection & Interference Control Catalog", pp. 4-5 (1985).

Electrolert, Inc., "Power Protection and Multiple Extender Line", Price List Effective Mar. 1, 1985.

Sutton Designs Inc., "ZX-5000 Series-Extended Range Surge Spike Noise Suppressor"-Advertisement (1985).

Kalglo Electronics Co., Inc. "Spike-Spiker, Transient Voltage Suppressors & Noise Filters", Dealer Price List, Jan. 1, 1985.

Perma Power Electronics, Inc. "Sockets Plus-Surge Suppressors", Price List, Aug. 1, 1984.

Ultima Electronics, Ltd. "Surge Free" Advertisment and Price List (1985).

Energy Electronic Systems Inc., "Snipper and Snipstrip", Dear Price List and Adverstisement, May 15, 1985.

Northern Telecom, "Model 2450 Surge Protector", Product Information Bulletin, No. 441A, Issue No. 2, Jul. 1985.

*Primary Examiner*—Todd E. DeBoer

*Attorney, Agent, or Firm*—Jerry M. Presson; Alfred N. Goodman

[57] ABSTRACT

A surge suppression module for providing existing wiring devices with a surge suppressing element for protection against transient surges of voltage in a power circuit. The surge module includes a universal support member that accommodates variously voltage-rated surge suppressing elements and various covers that accommodate different female wiring devicese to be mounted therein. The surge module also includes an alarm for detecting an electrical malfunction in the surge suppressing element and an indicator light for indicating proper electrical functioning of the surge suppressing element.

26 Claims, 8 Drawing Sheets

SURGE SUPPRESSION MODULE

This is a continuation of application Ser. No. 168,418 filed Mar. 15, 1988, now abandoned.

FIELD OF THE INVENTION

The invention relates to a surge suppression module for protecting conventional female wiring devices from transient surges of voltage in a power circuit. The surge suppression module supports therein an existing female wiring device of any voltage rating, i.e., 125, 250 or 125/250 volts, and is coupled to an existing outlet box. The module uses a universal support member that accommodates various surge suppressing elements of different voltage ratings and various covers that accommodate different female wiring devices to be mounted therein.

BACKGROUND OF THE INVENTION

The proliferation of electronic equipment, and in particular the use of micro-electronics, has caused a need for surge protection of equipment varying all the way from clock radios and other small appliances to computers and a huge variety of electronic, data processing, testing, analytical, and other electronic equipment.

While many surge protection devices are presently on the market, numerous disadvantages are present in these devices. The prior surge protection devices are designed to be used only in a power circuit of a particular voltage. Thus, these devices cannot be universally used for power circuits having different voltage ratings, but instead require a completely different unit for each voltage rating. This increases the number of different surge protection devices that must be produced and stocked to accommodate the various wiring devices having different voltage ratings used in the industry. Moreover, these protection devices are costly because they require special tooling for each voltage rating. In addition, many of these protection devices are built directly into the wiring device, thereby increasing the overall cost to provide existing power circuits with surge protection. Finally, many of these devices merely plug into existing female wiring devices and provide a second female outlet, thereby duplicating the female wiring device.

Examples of these prior surge protection devices are disclosed in the following U.S. Pat. Nos. 3,369,153 to Arnold et al.; 3,840,781 to Brown; 4,071,872 to Phillips, Jr.; 4,075,676 to Phillips, Jr.; 4,191,985 to Phillips, Jr.; 4,217,619 to Tibolla; 4,500,862 to Shedd; and 4,688,135 to Leopold.

SUMMARY

Accordingly, a primary object of the invention is to provide a surge protection device which may be easily adapted for use with wiring devices of 125, 250, or 125/250 volts and varying configurations.

Another object of the invention is to provide a surge protection device which utilizes a conventional wiring device to reduce manufacturing costs and the overall cost of the device.

A further object of the invention is to provide an advantageous method of manufacturing surge suppressing modules which decreases the number of devices that are produced and stocked while accommodating the need for surge protection of wiring devices of various voltage ratings.

The foregoing objects are basically attained by providing a surge suppressing module for providing transient voltage surge protection to an existing 125, 250, or 125/250 volt female wiring device, which is associated with an electrical outlet box and a power circuit of any current rating, the combination comprising a support member having means for coupling the support member to the outlet box; a surge suppressing element having a voltage rating of 125 volts, 250 volts, or 125/250 volts; first means on the support member for coupling the element to the support member; second means on the support member for coupling the female wiring device to the support member; a cover having an aperture therein; means, on the support member and the cover, for coupling the cover to the support member with the aperture aligned with the female wiring device; and means for electrically connecting the power circuit to the female wiring device and the surge suppressing element.

Other objects, advantages and salient features of the invention will become apparent from the following detailed description, which, taken in conjunction with the annexed drawings, discloses the preferred embodiment of the invention.

DRAWINGS

Referring now to the drawings which form a part of this original disclosure:

DETAILED DESCRIPTION OF THE INVENTION

Figure 1:
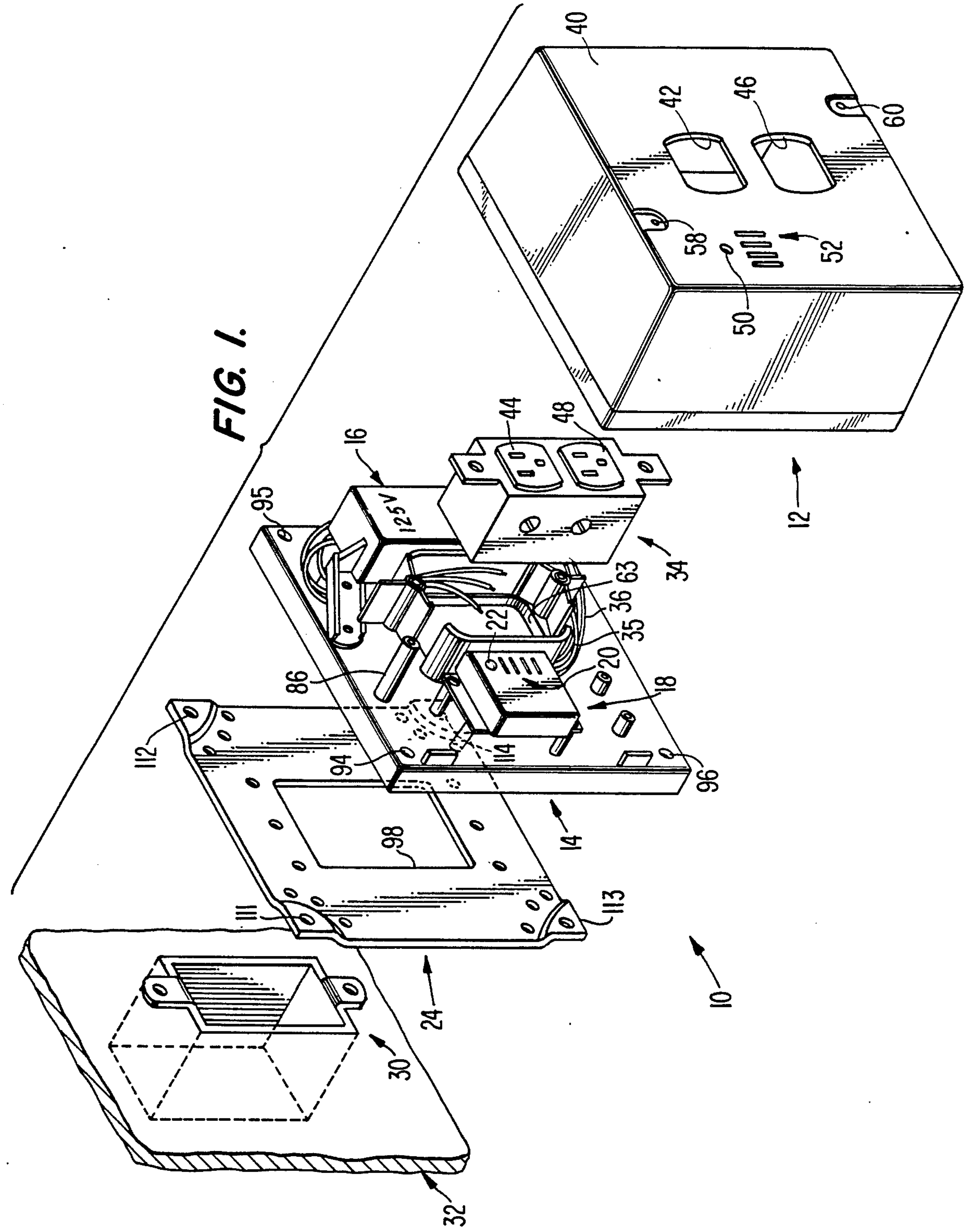
FIG. 1 is an exploded perspective view of a 125 volt duplex wiring device and an electrical outlet box in combination with the surge suppression module in accordance with the invention.

As seen in FIG. 1, the surge suppression module assembly 10 in accordance with the invention comprises a cover 12, a universal support member 14, a surge suppressing element 16 mounted on the support member 14, an electronic circuit member 18 having an auditory alarm 20 and an indicator light 22, and a mounting plate 24 for coupling the surge module assembly 10 to an electrical outlet box 30 mounted in the wall 32. The surge module assembly 10 shown in FIG. 1 supports therein a conventional 125 volt duplex wiring device 34; however, the wiring device may be either a single or a duplex with any conventional voltage rating, i.e., 125, 250, or 125/250 volts.

Figure 3:
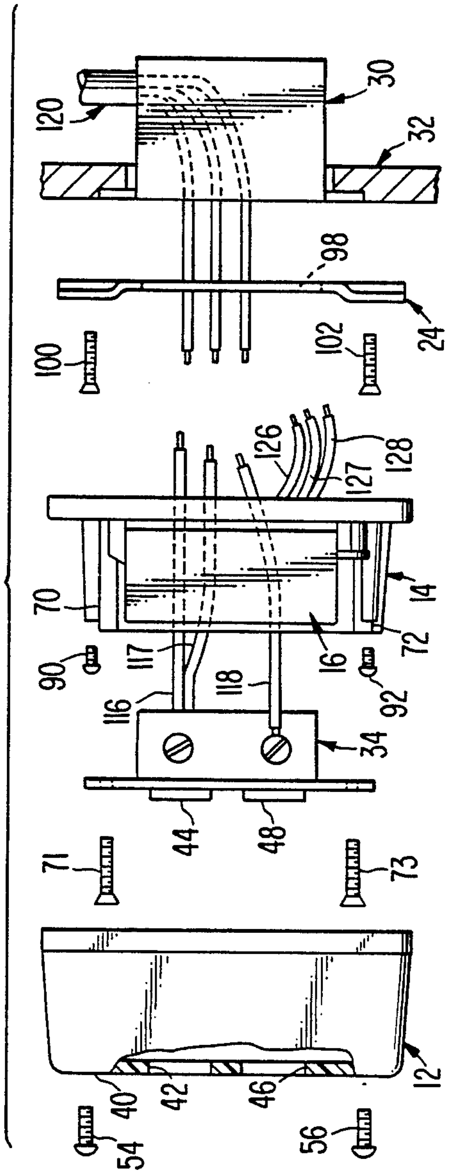
FIG. 3 is an exploded side elevational view of the structure shown in FIG. 1 and including the 125 volt wiring device and an electrical outlet box mounted in a wall, and the surge suppression module in accordance with the invention.
Figure 4:
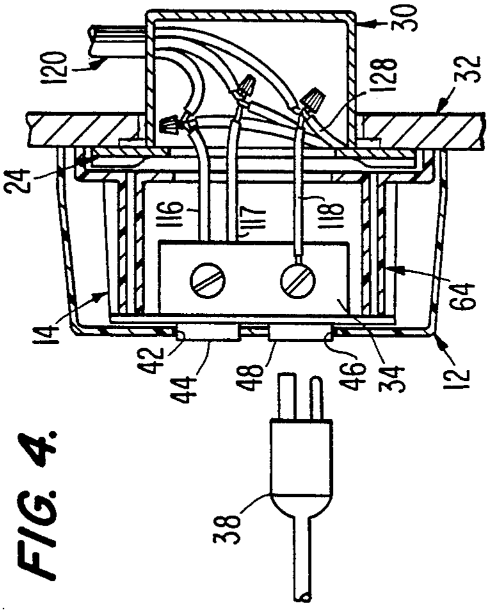
FIG. 4 is a cross-sectional side elevational view of the 125 volt duplex wiring device and the surge suppression module assembled in accordance with the invention and coupled to the wall mounted electrical box.

The cover 12 has a square box-like configuration and is comprised of a dielectric material, i.e., plastic. The cover 12 includes a planar front panel 40 with at least one aperture 42 therein for aligning with and receiving the contact face portion 44 of the wiring device 34, which is adapted to receive plug 38 as seen in FIG. 4. As seen in FIG. 1, the front panel 40 has a pair of apertures 42 and 46 for receiving the contact face portions 44 and 48, respectively, of the duplex wiring device 34. The front panel 40 also includes an opening 50 for receiving the indicator light 22 and a plurality of slots 52 for the auditory alarm 20. The cover 12 is coupled to the universal support member 14 by a pair of screws 54 and 56 through holes 58 and 60 in the front panel 40 as shown in FIG. 3 and into threaded mounting posts 86 and 88 on member 14 as seen in FIG. 5.

Although the cover 12 shown in the drawings only illustrates a 125 volt duplex cover, the invention encompasses a series of covers for the different wiring devices available in the electronic industry, i.e., single or duplex; 125, 250, or 125/250 volt.

The universal support member 14 is adapted to accommodate the various wiring devices available in the electronic industry. Thus, the surge module assembly 10 can be universally adapted to accommodate any existing wiring device by merely selecting the appropriate cover and surge suppressing element of the appropriate voltage rating. In this regard, surge suppressing elements are voltage dependent, but current independent. Thus, wiring devices of a given voltage rating but various current ratings, such as 15, 20 or 30 amperes, can be accommodated in the present invention using only one suppressing element rated to the given voltage.

Figure 5:
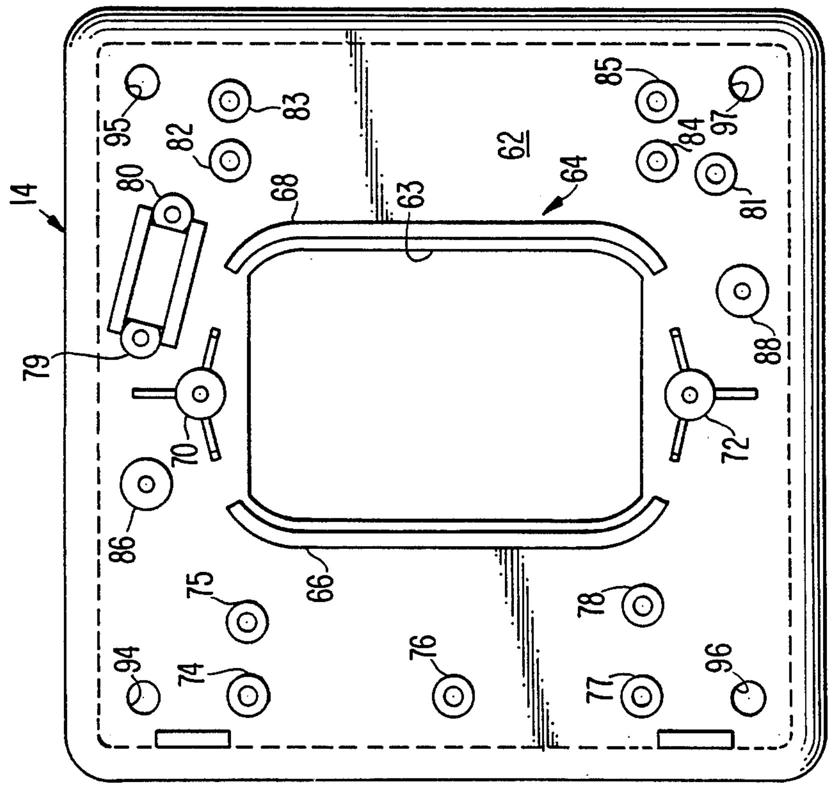
FIG. 5 is an enlarged front plan view of the universal support member seen in FIGS. 1, 3, and 4.

As seen in FIG. 5, the universal support member 14 is comprised of dielectric material, e.g., plastic, and includes a substantially planar base portion 62 with a central opening 63 therein surrounded by a tubular portion 64 for receiving wiring device 12. The tubular portion 64 includes a pair of opposed curved walls 66 and 68, and a pair of opposed flanged mounting members or posts 70 and 72 spaced between the curved walls 66 and 68. The wiring device 34 is coupled to posts 70 and 72 by screws 71 and 73 threadedly received therein as seen in FIG. 3. The universal support member 14 also includes a plurality of tubular mounting members or posts 74–81 extending perpendicular to the base portion 62 for receiving mounting screws for coupling the various surge suppressing elements 16, 16', or 16" and electronic circuit members 18, 18', or 18" shown in FIGS. 5–8 corresponding to the selected wiring device. Four locator pins 82–85 extend perpendicular to the base portion 62 for receiving a circuit board built into the surge suppressing element 16. The cover 12 is coupled to the universal support member 14 by screws 54 and 56 threaded into mounting posts 86 and 88, which extend perpendicular to the base portion 62.

As seen in FIGS. 1 and 3, the universal support member 14 is coupled to the metallic mounting plate 24 by two pairs of screws 90 and 92 (only two shown) extending through holes 94–97 in the base portion 62. The mounting plate 24 has a central electrical opening 98 for alignment with central opening 63 of the base portion 62, and a plurality of mounting holes extending therethrough for coupling the mounting plate 24 to either threaded bores in the outlet box 30 or the wall 32 by screws 100 and 102 seen in FIG. 3. The four corners of the mounting plate 24 have threaded holes 111–114 for threadedly receiving screws 90 and 92 to mount the universal support member 14 thereto. The corners of the mounting plate 24 are also raised to be received in a recess in the support member 14 to insure a flush mounting of the surge module assembly 10 to the wall 32 as seen in FIG. 4.

The surge suppressing element 16 comprises at least one metal oxide varistor (MOV) and a fuse mounted on a printed circuit board. The surge suppressing element 16 is electrically connected to the power circuit 120 as seen in FIG. 3, and in parallel to the wiring device 34 via wires 126–128. The surge suppressing element 16 is also electrically connected to the electronic circuit 18 via wires 35 and 36 as seen in FIGS. 1 and 6.

The electronic circuit 18 includes an auditory alarm 20, which will sound in the event of a failure or malfunction in the surge suppressing element, i.e., if the fuse on the circuit board is burned out. The electronic circuit 18 also includes an indicator light 22 which indicates that the surge suppressing element 16 is electrically connected and the wiring device 34 is protected against transient surges of voltage.

Figure 7:
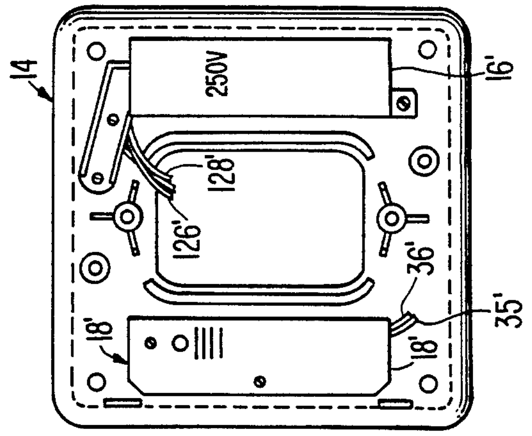
FIG. 7 is a front plan view of the universal support member with a surge suppressing element rated for a 250 volt wiring device coupled thereto.
Figure 6:
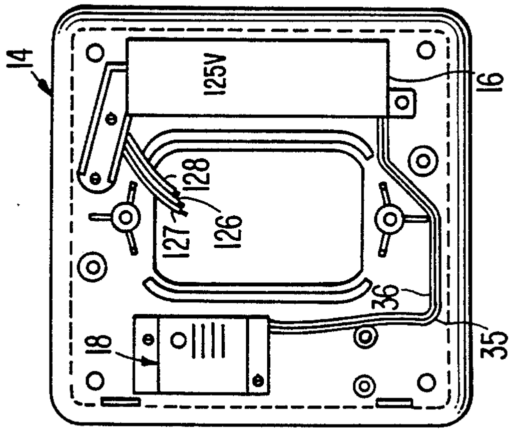
FIG. 6 is a front plan view of the universal support member with a surge suppressing element rated for a 125 volt wiring device coupled thereto.
Figure 8:
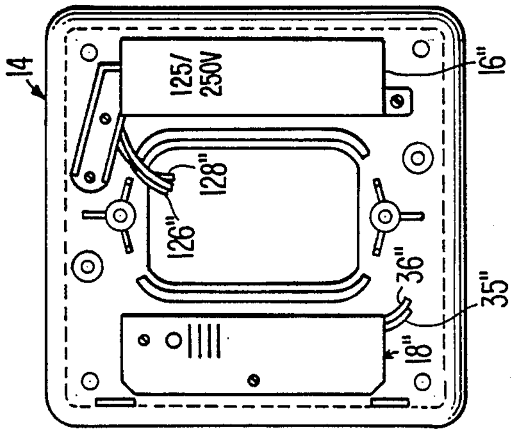
FIG. 8 is a front plan view of the universal support member with a surge suppressing element rated for a 125/250 volt wiring device coupled thereto.

As seen in FIGS. 6–8, three universal support members 14 are shown respectively with surge suppressing elements 16, 16' and 16", connecting wires 35, 36, 35', 36', 35" and 36", and electronic circuits 18, 18' and 18" corresponding with a 125 volt, a 250 volt, and a 125/250 volt wiring device, respectively.

Figure 2:
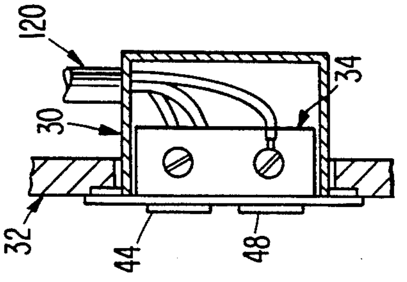
FIG. 2 is a cross-sectional side elevational view of a conventional 125 volt duplex wiring device received in and coupled to an electrical outlet box.

As seen in FIGS. 2–4, the surge module assembly 10 is used to convert an existing conventional wiring device 34, which is coupled to an electrical outlet box 30 (FIG. 2), to a surge protected device (FIG. 4). The surge module assembly 10 is installed by first removing the existing wiring device 34 from outlet box 30. Then three wires or pigtails 116–118 are connected to the wiring device. Next, the mounting plate 24 is coupled to the outlet box 30 or the wall 32. Then, the universal support member 14, supporting the appropriate surge suppressing element 16 and electronic circuit 18, is attached to the existing wiring device 34, which is received in tubular portion 64. The pigtails 116–118 are connected to the three wires in the power circuit 120, and to the three wires 126–128 extending from the appropriate surge suppressing element 16. The universal support member 14, is now attached to the mounting plate 24, and then the appropriate cover 12 is secured to the universal support member 14 with the contact face portions 44 and 48 received in apertures 42 and 46. Then plug 38 is attached to the desired face portion.

As seen in FIG. 4, the wiring device 34 is supported by the dielectric universal support member 14 and is isolated from and not electrically connected to metallic mounting plate 24 or outlet box 30. Thus, since the wiring device is not electrically connected or bonded to any metal parts within the module assembly, it can be used as an isolated (or insulated) grounding device, that is, one where the equipment grounding contacts are electrically isolated or insulated from the mounting means, without the need for a special isolated grounding wiring device. Instead, connection of the ground pigtail on the wiring device to an insulated grounding line in the power circuit 120 suffices.

While various advantageous embodiments have been chosed to illustrate the invention, it will be understood by those skilled in the art that various changes and modifications can be made therein without departing from the scope of the invention as defined in the appended claims.

What is claimed is:

1. A surge suppressing module for providing transient voltage surge protection between electrical wires of a power circuit of any current rating located in an electrical outlet box and a conventional plug of an electrical device, the combination comprising:

only one female wiring device electrically coupled in series between the electrical wires of the power circuit and the plug, said wiring device being conventional and having at least one female socket for receiving the plug therein;

a support member having means for coupling said support member to the outlet box;

a surge suppressing element having a voltage rating of 125 volts, 250 volts, or 125/250 volts, said surge suppressing element being a separate and independent replaceable unit from said conventional female wiring device;

first means on said support member for coupling said surge suppressing element to said support member;

second means on said support member for coupling said conventional female wiring device to said support member;

a cover having an open aperture therein; and means, on said support member and said cover, for coupling said cover to said support member with said aperture coaxially aligned with said female socket on said female wiring device;

the electrical wires of the power circuit, extending directly between (a) said conventional female wiring device and said surge suppressing element and (b) the power circuit, for electrically connecting the power circuit directly to said conventional female wiring device and said surge suppressing element, whereby, the conventional plug can pass through said aperture and directly engage said female socket of said conventional female wiring device.

2. A surge suppressing module as defined in claim 1, wherein said support member includes a substantially planar base portion with said second coupling means extending perpendicular thereto.

3. A surge suppressing module as defined in claim 1, wherein said support member includes a substantially planar base portion with a tubular portion extending perpendicular thereto.

4. A surge suppressing module as defined in claim 1, wherein said support member is comprised of dielectric material.

5. A surge suppressing module as defined in claim 1, wherein said support member includes a substantially planar base portion having an opening therein for electrically connecting the wiring device through said base portion to the power circuit.

6. A surge suppressing module as defined in claim 1, wherein said means for coupling said support member to said outlet box comprises a mounting plate.

7. A surge suppressing module as defined in claim 6, wherein said mounting plate is comprised of metal.

8. A surge suppressing module as defined in claim 6, wherein said mounting plate has an opening therethrough for electrically connecting the power circuit through the mounting plate to the wiring device and said surge suppressing element.

9. A surge suppressing module as defined in claim 1, wherein said cover has a planar front wall.

10. A surge suppressing module as defined in claim 9, wherein said cover has side walls depending from said front wall.

11. A surge suppressing module as defined in claim 1, wherein said cover is comprised of dielectric material.

12. A surge suppressing module as defined in claim 1, wherein said second coupling means includes a pair of tubular members, each threadedly receiving a screw therein.

13. A surge suppressing module as defined in claim 12, wherein said tubular members have flanges.

14. A surge suppressing module as defined in claim 13, and further comprising a pair of walls cooperating with said flanged tubular members to form a tubular portion which surrounds the wiring device.

15. A surge suppressing module as defined in claim 1, wherein p1 said first coupling means includes a plurality of tubular members, each threadedly receiving a screw therein.

16. A surge suppressing module as defined in claim 1, and further comprising means, coupled to said element, for indicating that said surge suppressing element is electrically functioning.

17. A surge suppressing module as defined in claim 1, and further comprising means, coupled to said element, for signaling an electrical malfunction of said surge suppressing element.

18. A surge suppressing module for providing protection against transient surges of voltage between electrical wires of a power circuit of any current rating located in an electrical outlet box and an electrical plug of an electrical device, the combination comprising:

a support member;

only one female wiring device electrically coupled in series between the electrical wires of the power circuit and the plug, said female wiring device being conventional;

means on said support member for coupling said support member to the electrical outlet box;

a cover with at least one aperture therein;

means, on said support member and said cover, for coupling said cover to said support member;

a voltage surge suppressing element for suppressing transient surges of voltage;

means for coupling said element to said support member;

said element being a separate and independent replaceable unit from said conventional wiring device and being electrically coupled to said conventional wiring device and the electrical wires of the power circuit in the outlet box by a set of electrical wires that extend directly between (a) said conventional female wiring device and said element and (b) the power circuit; and means on said support member for coupling said female wiring device to said support member with a contact face portion positioned for receiving the electrical plug through said aperture in said cover.

19. A module as defined in claim 18, wherein said support member is compromised of dielectric material.

20. A module as defined in claim 18, wherein said means for coupling said element to said support member includes means, on said support member, adapted for supporting elements of different voltage ratings to correspond with the female wiring device having a predetermined voltage rating.

21. A module as defined in claim 18, wherein said support member includes a substantially planar base portion, and means, extending from said base portion, for receiving the wiring device therein.

22. A module as defined in claim 21, wherein said means for receiving includes a tubular portion for coupling the wiring device thereto.

23. A module as defined in claim 21, wherein said tubular portion includes a pair of walls partially surrounding the wiring device.

24. A module as defined in claim 21, wherein said base portion has an opening through which the wiring device is electrically coupled to the power circuit.

25. A module as defined in claim 18, wherein said support member is comprised of dielectric material, and said means on said support member for coupling the wiring device to said support member includes means for isolating the wiring device from electrical connection with the outlet box.

26. A method of manufacturing a surge suppressing module for providing transient voltage surge protection between electrical wires of a power circuit of any current rating located in an electrical outlet box and a conventional plug of an electrical device, comprising the steps of selecting one conventional female wiring device of any voltage rating with at least one female socket for receiving the plug therein, and which has either signal or duplex contact face portions, selecting a surge suppressing element having a voltage rating corresponding to the specific voltage rating of the conventional female wiring device with the selected surge suppressing element being a separate and independent replaceable unit from the conventional female wiring device, mounting the selected surge suppressing element and the female wiring device on a support member, electrically wiring, and thereby electrically connecting, the power circuit directly to the female wiring device and the surge suppressing element with only the one female wiring device being electrically coupled in series between the electrical wires of the power circuit and the plug received in the female socket of the one female wiring device, coupling the support member to the outlet box, selecting a cover having a number of apertures therein corresponding to the number of contact face portions in the female wiring device, and coupling the cover to the support member with the apertures therein aligned with the corresponding contact face portions in the female wiring device.

* * * * *